United States Patent
Qian et al.

(10) Patent No.: US 8,739,177 B2
(45) Date of Patent: May 27, 2014

(54) METHOD FOR NETWORK INTERFACE SHARING AMONG MULTIPLE VIRTUAL MACHINES

(75) Inventors: Yi Qian, Shanghai (CN); Hua Zhou, Shanghai (CN); Fujin Huang, Shanghai (CN); Michael A. Rothman, Puyallup, WA (US); Vincent J. Zimmer, Federal Way, WA (US)

(73) Assignee: Intel Corporation, Santa Clara, CA (US)

( * ) Notice: Subject to any disclaimer, the term of this patent is extended or adjusted under 35 U.S.C. 154(b) by 829 days.

(21) Appl. No.: 12/819,948

(22) Filed: Jun. 21, 2010

(65) Prior Publication Data

US 2011/0314469 A1   Dec. 22, 2011

(51) Int. Cl.
- *G06F 3/00* (2006.01)
- *G06F 9/455* (2006.01)
- *G06F 15/167* (2006.01)

(52) U.S. Cl.
USPC .............................. 719/312; 718/1; 719/321

(58) Field of Classification Search
None
See application file for complete search history.

(56) References Cited

U.S. PATENT DOCUMENTS

| | | | |
|---|---|---|---|
| 7,620,955 | B1 | 11/2009 | Nelson |
| 2006/0206300 | A1 | 9/2006 | Garg et al. |
| 2007/0140263 | A1 | 6/2007 | Mitome et al. |
| 2008/0028441 | A1 | 1/2008 | Novoa et al. |
| 2008/0080512 | A1* | 4/2008 | Gofman et al. ............... 370/392 |
| 2008/0215770 | A1 | 9/2008 | Liu et al. |
| 2009/0222542 | A1 | 9/2009 | Miyajima |
| 2010/0030898 | A1 | 2/2010 | Imai et al. |
| 2010/0031325 | A1 | 2/2010 | Maigne et al. |

FOREIGN PATENT DOCUMENTS

| | | |
|---|---|---|
| CN | 101008903 A | 8/2007 |
| CN | 101241445 A | 8/2008 |
| CN | 101496023 A | 7/2009 |
| GB | 2442349 A | 4/2008 |

(Continued)

OTHER PUBLICATIONS

European Search Report received for European Patent Application No. 11250548.2, mailed on Sep. 7, 2011, 4 pages.

(Continued)

*Primary Examiner* — H S Sough
*Assistant Examiner* — Kimberly Jordan
(74) *Attorney, Agent, or Firm* — Barnes & Thornburg LLP

(57) ABSTRACT

In a computing system, sharing a physical NIC device among multiple virtual machines may be implemented by a customer virtual machine by receiving, by a virtual network interface card (NIC) driver of a customer operating system (OS) running in the customer virtual machine on a computing system, a customer OS request packet for transmission by a physical NIC driver over a network coupled to the computing system, and copying at least a portion of the customer OS request packet into a free block of shared memory of the computing system and appending the block to a transmission queue in the shared memory. Next, a service virtual machine may support the implementation by fetching the block from the transmission queue by a virtual NIC driver of a service OS running in a service virtual machine and packaging the portion into a service OS request packet, passing the service OS request packet to a service OS network stack component of the service OS, routing the service OS request packet, by a bridge driver of the service OS network stack component, to the physical NIC driver, and sending the service OS request packet over the network by the physical NIC driver.

31 Claims, 9 Drawing Sheets

(56) References Cited

FOREIGN PATENT DOCUMENTS

| JP | 2007-158870 A | 6/2007 |
|---|---|---|
| JP | 2010-003257 A | 1/2010 |
| JP | 2010-39626 A | 2/2010 |
| JP | 2010-514028 A | 4/2010 |
| WO | 2011078855 A1 | 6/2011 |

OTHER PUBLICATIONS

Zhao-Long, Jiang et al., "An Approach to Implementing the NIC Virtualization by the Hybrids of Single System Image and Hardware-assisted Virtualization Technologies", International Colloquium on Computing, Communication. Control, and Management (ISECS), Computing, Communication, Control, and Management 2009 (CCCM 2009), Aug. 8, 2009, pp. 577-582.

Office Action received fer European Patent Application No. 11250548.2, mailed on Oct. 11, 2011, 5 pages.

Office Action received for Japanese Patent Application No. 2011-110731, mailed Dec. 25, 2012, 2 pages of Japanese Office Action and 2 pages of unofficial English translation.

Intention to Grant received for European Patent Application No. 11250548.2, mailed Dec. 19, 2012, 32 pages.

Decision for Grant received for Japanese Patent Application No. 2011-110731, mailed Apr. 16, 2013, 1 page of Japanese Decision for Grant and 1 page of unofficial, partial English translation.

Office Action received for Korean Patent Application No. 10-2011-60373, mailed Mar. 29, 2013, 3 pages of Korean Office Action and 2 pages of unofficial English translation.

Office Action received for Chinese Patent Application No. 201110165550.5, mailed on Jun. 21, 2013, 19 pages of Office Action Including 12 page of unofficial English translation.

Office Action received for Korean Patent Application No. 10-2011-60373, mailed on Dec. 30, 2013, 12 pages of Office Action Including 6 pages of unofficial English translation.

Office Action received for Chinese Patent Application No. 201110165550.5, mailed on Dec. 2, 2013, 7 pages of Office Action Including 4 pages of unofficial English translation.

* cited by examiner

METHOD FOR NETWORK INTERFACE SHARING AMONG MULTIPLE VIRTUAL MACHINES

BACKGROUND

1. Field

Embodiments of the present invention relate generally to computing systems and, more specifically, to system firmware and virtualization.

2. Description

Many computing systems include a network interface card (NIC) to provide for communications with other systems and devices over a network. In a computing system running multiple operating systems (OSs) on multiple virtual machines, each OS typically needs to communicate with its own NIC. Thus, multiple NICs are required to be installed on the computing system to support the multiple OSs running in virtual machines. However, it may be uneconomical and perhaps impractical to install multiple NICs. In some instances, the computing system has no spare Peripheral Component Interconnect (PCI) or PCI Express (PCIE) slots to install additional NICs, or has no room in the specific form factor of the computing system. In other cases, the cost of additional NICs may be prohibitive for the overall cost of the computing system.

BRIEF DESCRIPTION OF THE DRAWINGS

The features and advantages of the present invention will become apparent from the following detailed description of the present invention in which.

DETAILED DESCRIPTION

Embodiments of the present invention comprise a system and method for sharing one physical network interface card (NIC) device among multiple virtual machines (VMs) in a computing system. In embodiments of the present invention, one operating system (OS) called the Service OS, running in a first VM, controls access to the physical NIC and services communications requests from one or more other OSs, called Consumer OSs. A Consumer OS runs in another VM and interacts with a user of the computer system via an application program. The application program runs in the same VM as the Consumer OS. When the Consumer OS needs to communicate over the physical NIC device, the Consumer OS sends a network request packet to the Service OS. The Service OS interprets the network request packet and forwards the packet to the physical NIC. Hence, the Service OS virtualizes the NIC for the Consumer OS, without requiring the computing system to include a physical NIC for each Consumer OS.

Reference in the specification to "one embodiment" or "an embodiment" of the present invention means that a particular feature, structure or characteristic described in connection with the embodiment is included in at least one embodiment of the present invention. Thus, the appearances of the phrase "in one embodiment" appearing in various places throughout the specification are not necessarily all referring to the same embodiment.

Figure 1:
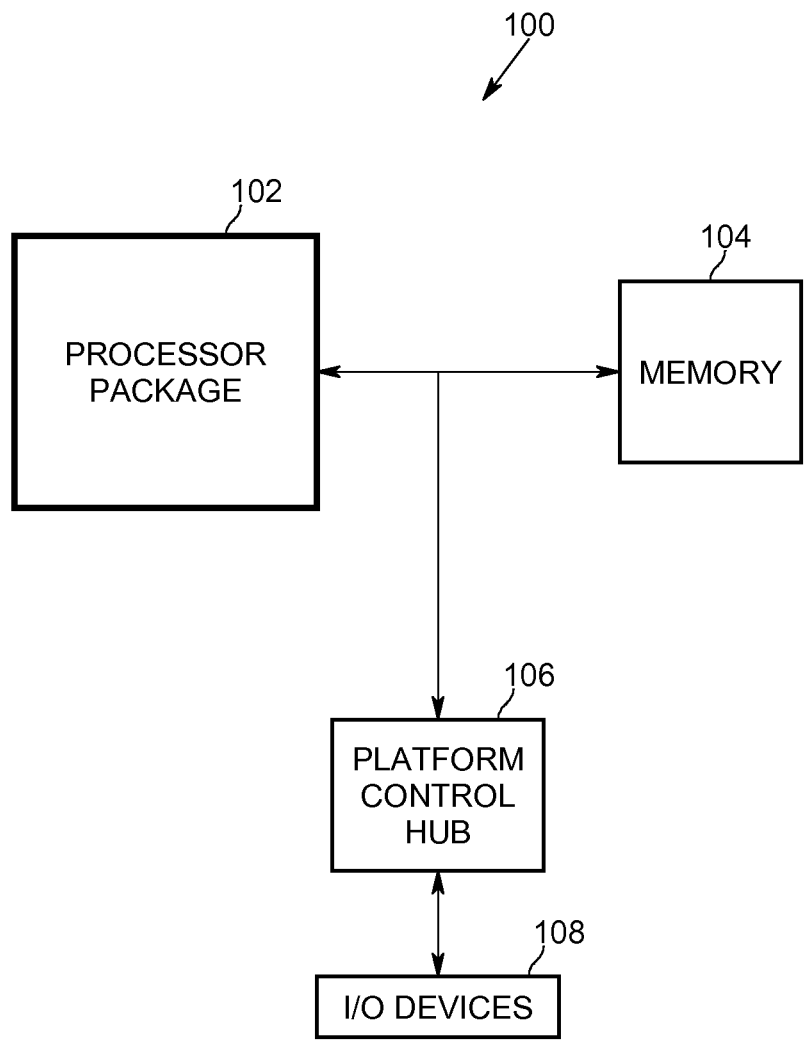
FIG. 1 is a diagram of a Secure Enclave session in a computing system according to an embodiment of the present invention.

In order to protect the virtualization of the physical NIC, in embodiments of the present invention the first VM running the Service OS may be executed within a Secure Enclave (SE) session within the processor package of the computing system. FIG. 1 is a diagram of a Secure Enclave session in a computing system according to an embodiment of the present invention. For purposes of explanation, portions of computing system 100 are shown in FIG. 1 in simplified form. Processor package 102 comprises one or more processing cores within a security perimeter. In one embodiment, the security perimeter may be the processor package boundary (shown as a thick line in FIG. 1). The processor package interfaces with memory 104 and platform control hub (PCH) 106. The PCH interfaces with one or more I/O devices 108. Implementation of a Secure Enclave capability involves providing several processor instructions which create the secure enclave and enforce isolation and provide protection of instruction execution and data access. Data and code outside of the processor package may be encrypted and integrity checked. Data and code inside of the processor package may be unencrypted and protected by a mode and cache protection mechanism. In an embodiment, data does not "leak" from the secure enclave. Microcode within the processor package saves the enclave state information inside the enclave for interrupts, exceptions, traps and Virtual Machine Manager (VMM) exits. The Secure Enclave capability is described in the PCT patent application entitled "Method and Apparatus to Provide Secure Application Execution" by Francis X. McKeen, et al., filed in the USPTO as a Receiving Office on Dec. 22, 2009, as PCT/US2009/069212, and incorporated herein by reference.

Figure 2:
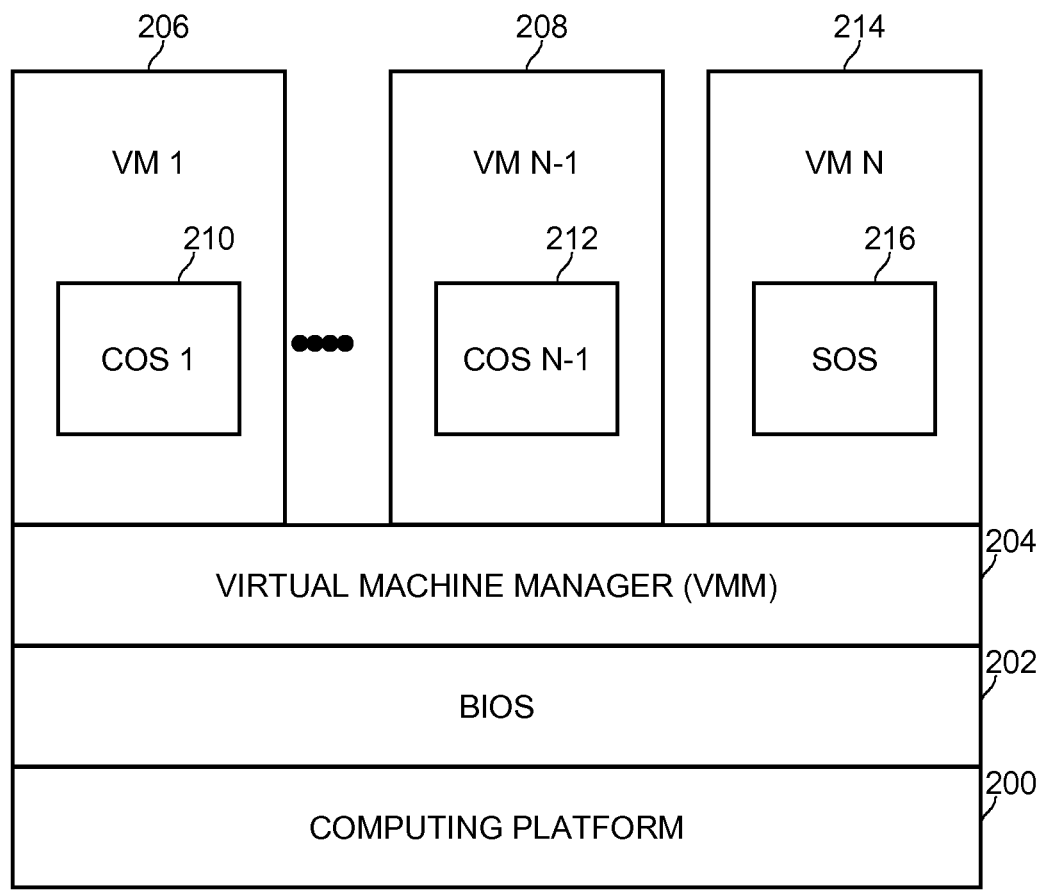
FIG. 2 is a diagram of a computing system illustrating multiple virtual machines according to an embodiment of the present invention.

FIG. 2 is a diagram of a computing system illustrating multiple virtual machines according to an embodiment of the present invention. The computing system comprises computing platform 200, which comprises processor package 102, memory 104, PCH 106, and I/O devices 108 of FIG. 1, as well as other conventional components that are not shown. One of the I/O devices may be a NIC. System firmware, known as basic input/output system (BIOS) 202, executes on the computing platform starting at system boot time to identify, test, and initialize the computing platform components and to provide interfaces to computing platform hardware to software components of the computing system. In embodiments of the present invention supporting known virtualization technology, a virtual machine manager (VMM) may be executed immediately after the BIOS finishes initialization of the computing platform. The VMM supports the concurrent execution of multiple virtual machines on the computing platform. The VMM presents guest operating systems with a virtual platform and monitors the execution of the guest operating systems. In that way, multiple operating systems, including multiple instances of the same operating system, can share hardware resources. Unlike multitasking, which also allows applications to share hardware resources, the virtual machine approach using a VMM isolates failures in one operating system from other operating systems sharing the hardware. The VMM prepares the execution environment for VMs in the system. The VMM launches one or more VMs as required.

In embodiments of the present invention, multiple VMs may be launched and executed concurrently, and there may be at least two kinds of VMs. One kind of VM is a Service VM 214 running a Service OS (SOS) 216. The Service OS generally provides services to other OSs running in other VMs, and interacts with VMM 204 to provide those services. A second kind of VM is a Consumer OS (COS) 210 (also called a Guest OS) running in a Consumer VM 206. The Consumer OS supports application programs (not shown in FIG. 2) interacting with a user of the computing system. The Consumer OS relies on services provided by VMM 204 and Service OS 216. Application programs running within a Consumer VM cannot directly interact with the Service OS running in the Service VM. In embodiments of the present invention, multiple Consumer VMs 1 206 to N-1 208 may be launched, running Consumer OSs 1 210 to N-1 212, respectively.

Figure 3:
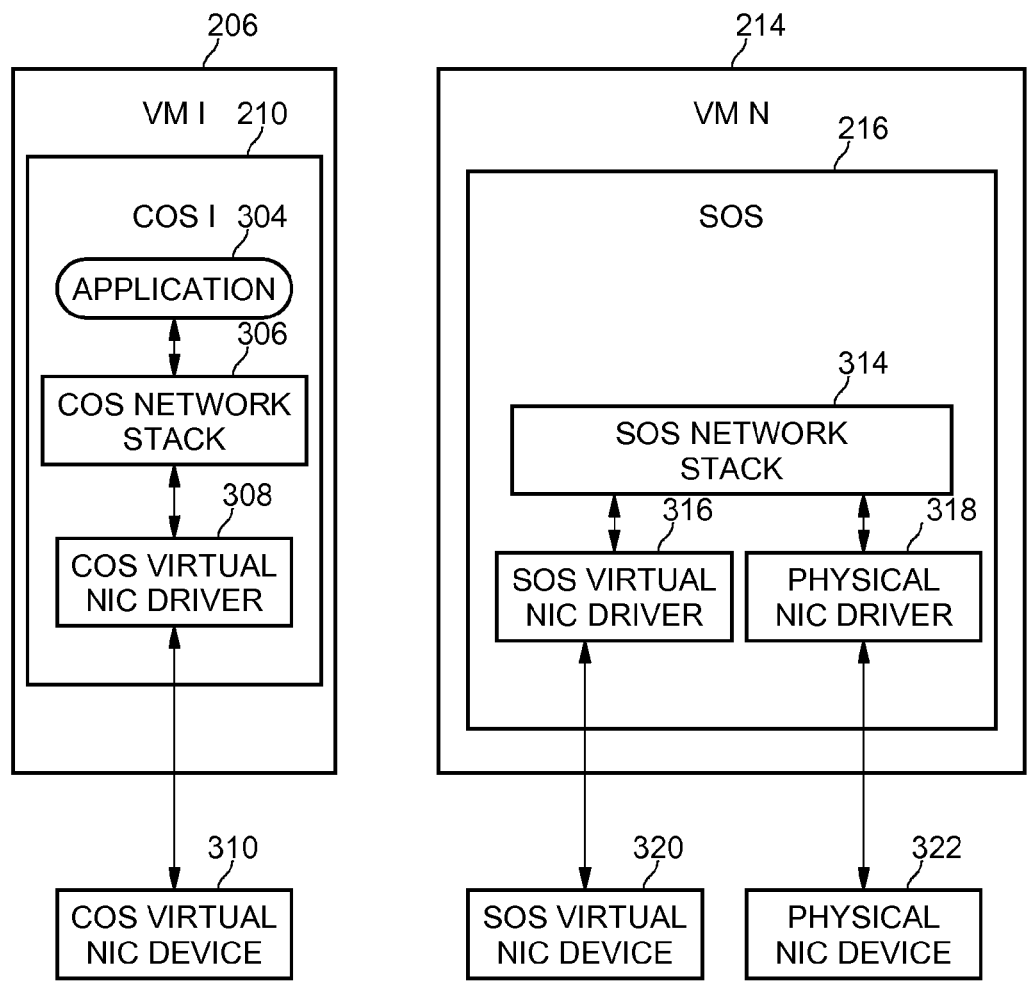
FIG. 3 is a diagram of a computing system illustrating network stacks for virtual machines according to an embodiment of the present invention.

FIG. 3 is a diagram of a computing system illustrating network stacks for virtual machines according to an embodiment of the present invention. In an embodiment, in order to provide network services to application program 304 supported by one of the Consumer OSs such as COS 1 210 executing within Consumer VM 1 206, VMM 204 (not shown in FIG. 3) creates a COS virtual NIC device 310. To the Consumer OS, this virtualized NIC device functions like a physical NIC device. A COS virtual NIC driver component 308 may be created within Consumer OS 1 210. COS virtual NIC driver 308 may be responsible for processing network requests from the upper level COS network stack 306 and responding with request results. When application program 304 requests I/O over the physical NIC device, the request may be processed by COS network stack 306, COS virtual NIC driver 308, and COS virtual NIC device 310. Responses processed by COS virtual NIC device 310 may be forwarded back to the application program via COS virtual NIC driver 308 and COS network stack 306.

A corresponding Service OS (SOS) virtual NIC device 320 may be created for access by Service VM 214. A corresponding SOS virtual NIC driver 316 may also be created within Service OS 216 running in Service VM 214. A request by COS virtual NIC device 310 coupled to Consumer VM 206 may be forwarded for processing to SOS virtual NIC device 320 coupled to Service VM 214. The request may be handled by SOS virtual NIC device 320 and SOS network stack 314 within the Service OS. Since the Service OS interacts with physical NIC device 322, the Service OS may control implementation of the request by physical NIC driver 318 and physical NIC device 322. Responses to the request may flow in the opposite direction, from physical NIC device 322 to physical NIC driver 318 through SOS network stack 314, SOS virtual NIC driver 316, and SOS virtual NIC device 320 back to the Service OS. Thus, Consumer OS 210 has the illusion that it is communicating with physical NIC device 322.

When Service OS 216 is run within a Secure Enclave session, I/O requests involving physical NIC device 322 may be protected from malicious processing by application programs in the Consumer VM or other programs running within a Consumer OS. At system initialization time, or whenever a physical NIC device is added to the computing system, a Secure Enclave session may be started to protect access to the physical NIC device.

Figure 4:
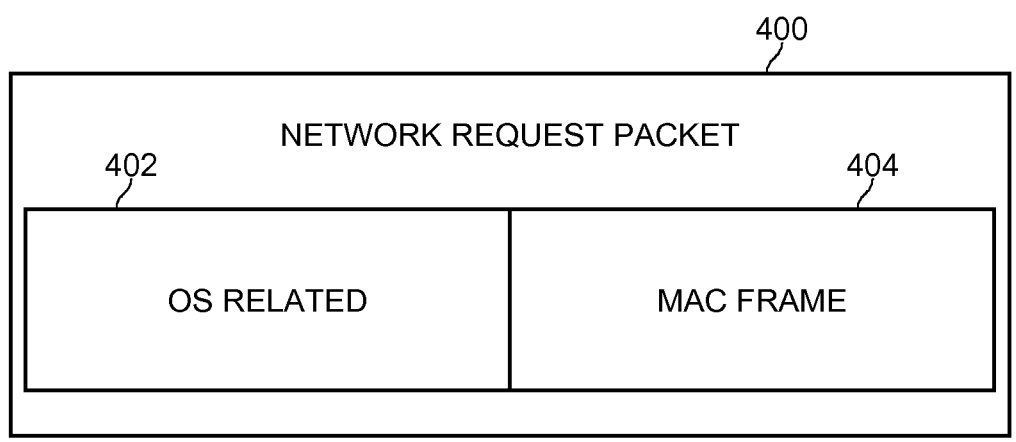
FIG. 4 is a diagram of a network request packet according to an embodiment of the present invention.

An I/O request in the form of a network request packet arriving at COS virtual NIC driver 308 from application program 304 via COS network stack 306 has been processed by network protocol layers such as Transmission Control Protocol (TCP), User Datagram Protocol (UDP), and Internet Protocol (IP). The network request packet contains information necessary for transmission over a network, such that the packet may be provided to the physical NIC driver to transmit on the physical NIC device. FIG. 4 is a diagram of a network request packet according to an embodiment of the present invention. Network request packet 400 comprises OS related information 402, and Media Access Control (MAC) frame information 404. OS related information 402 contains information and/or parameters used by network stack drivers or NIC device drivers. This part will be not transmitted on the network interface of the physical NIC device and might not be understood by the Service OS, so this part of the network request packet may be ignored. The MAC frame information is the actual content sent on the network interface (e.g., the basic transmission unit on the Ethernet network media).

According to embodiments of the present invention, there is no physical NIC device directly available for the Consumer OS, therefore, COS virtual NIC driver 308 relies on components of the Service VM and the VMM to send the packet. The VMM notifies the Service OS when there are packets to process and creates a shared memory area for use in exchanging data between the Consumer VM and Service VMs. The shared memory area may be made visible to both the Consumer OS and the Service OS, so that the virtual NIC driver in each VM can access the packets and process them accordingly. In one embodiment, the shared memory may be implemented within memory 104.

Figure 5:
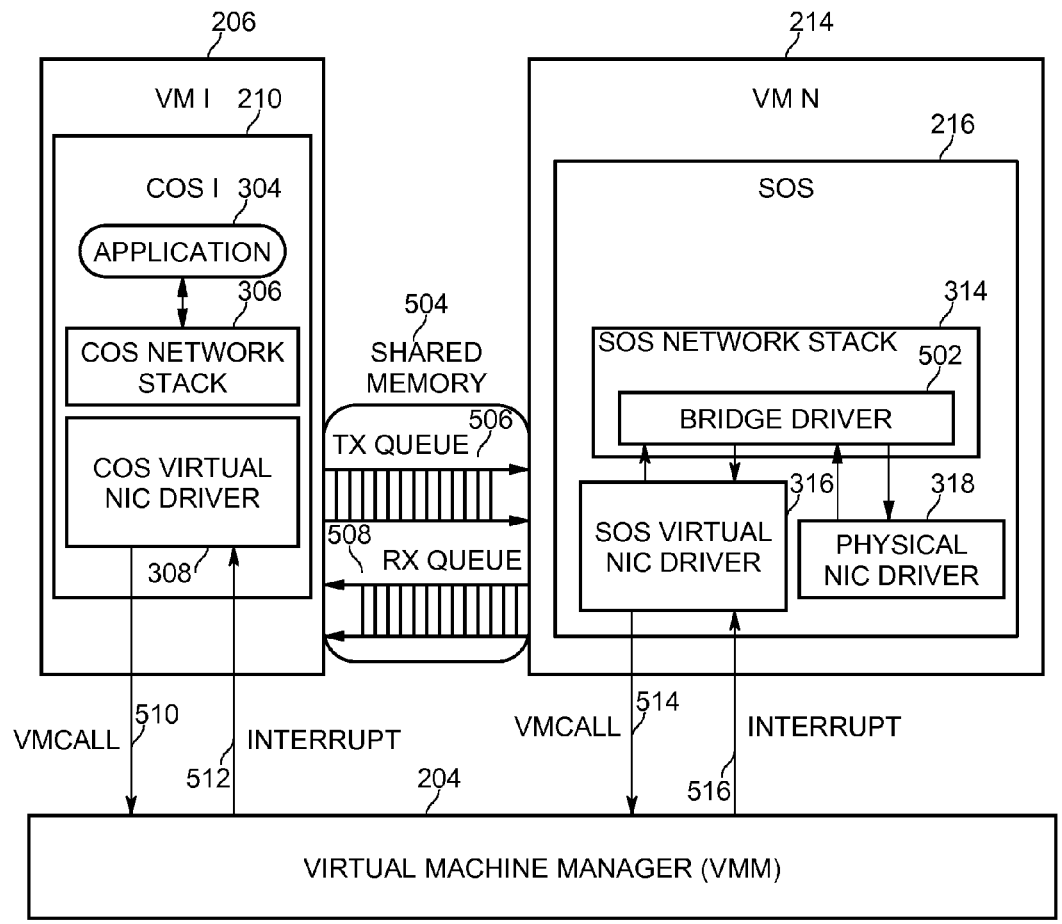
FIG. 5 is a diagram of shared memory and communications between virtual machines according to an embodiment of the present invention.

FIG. 5 is a diagram of shared memory and communications between virtual machines according to an embodiment of the present invention. COS virtual NIC driver 308 may extract the MAC frame 404 from the network request packet, allocate a memory block from the shared memory, copy the MAC frame into the shared memory block, and append this block into a designated transmission (TX) queue 506. The TX queue 506 exists in the shared memory to help manage outgoing MAC frames. In the reverse path, when there are packets received by the physical NIC device 322 that are managed by the Service OS, the components of the Service OS (i.e., physical NIC driver 318, SOS network stack 314, and SOS virtual NIC driver 316) extract the MAC frame, copy the MAC frame contents into a free memory block in shared memory, and append the block into a reception (RX) queue 508.

COS virtual NIC driver 308 may inform the Service OS that there are MAC frames that need to be transmitted in the following manner. In embodiments of the present invention, a message notification mechanism using known virtualization technology may be used. VMM 204 may operate as the intermediary between the Consumer OS and the Service OS, and may notify the appropriate OS as required.

For example, when Customer OS 1 210 wants to communicate with Service OS 216, the Customer OS may execute a privileged instruction named VMCALL 510. The VMCALL instruction is used to exit the current VM environment and call selected services in VMM 204. Those services may be offered by the handler of the VMCALL instruction in the VMM. The VMCALL handler (not shown in FIG. 5) may check the input parameters of the VMCALL and determine whether the VMM should inform the Service OS. If so, the VMM logs the message, and returns control to the Customer OS. Since VMM is always a running process within the computing system, the VMM attempts to inform the Service OS using Interrupt 516 when the VMM turns to the time slot for Service OS execution. Similarly, when the Service OS wants to communicate with the Customer OS, the Service OS may execute VMCALL 514 and the VMM may notify the Customer OS using Interrupt 512.

On the Service OS side, since the Service OS is an agent of the Customer OS for network transmission and reception, embodiments of the present invention provide two driver components to support this agency arrangement. One is SOS virtual NIC driver 316. The other is bridge driver component 502. SOS virtual NIC driver 316 in the Service OS is in charge of collecting outgoing MAC frames from the Customer OS via transmission TX queue 506 in shared memory 504 and passing them to the physical NIC driver 318 through the bridge driver. The bridge driver also receives incoming packets from physical NIC driver 318 that are intended for the Customer OS and puts the packets into the reception RX queue 508 in shared memory 504 for access by the Customer OS. In detail, when SOS virtual NIC driver 316 is informed by VMM 204 that there are outgoing packets in transmission TX queue 506, the SOS virtual NIC driver in the Service OS extracts the MAC frame from the transmission TX queue, repackages the frame into a new network request packet, and commits the new packet to the SOS network stack 314. On the other hand, when SOS virtual NIC driver 316 receives packets from the SOS network stack that are headed to the Customer OS, the SOS virtual NIC driver removes the OS-related portion and puts the MAC frame into reception RX queue 508 for access by the Customer OS. This message notification method described may be used to inform the Customer OS to process the incoming packets.

In embodiments of the present invention, the bridge driver 502 implements a filter driver in the IP protocol layer, therefore the bridge driver checks all inbound packets from the physical NIC device via the physical NIC driver 318 and routes them to the correct destination. For example, if the bridge driver finds a packet received from SOS virtual NIC driver 316, the bridge driver forwards the packet to physical NIC driver 318. If the bridge driver finds a packet received from physical NIC driver 318, the bridge driver will check the IP address information in this packet and determine whether the packet should go to the Customer OS 210 or the Service OS 216. If the bridge driver determines this packet is to go to Customer OS 210, the bridge driver forwards the packet to the SOS virtual NIC driver 316, for further forwarding of the information to the Customer OS.

The destination of packets received from physical NIC driver 318 may be differentiated between Customer OS and Service OS in at least two methods. One method is that the Customer OS and the Service OS use different IP addresses, so that bridge driver 502 may refer to the IP address information inside the received network packet and determine which OS is the packet's receptor. A second method is that the Customer OS and the Service OS may use the same IP address, but use a different range of TCP or UDP ports. The first method may make the packet routing logic simple, but costs more IP address resources. The second method may save IP address resources, but may result in the packet routing logic within the bridge driver being more complex. The choice between these two methods depends on intended usage models and is an implementation decision.

Figure 6:
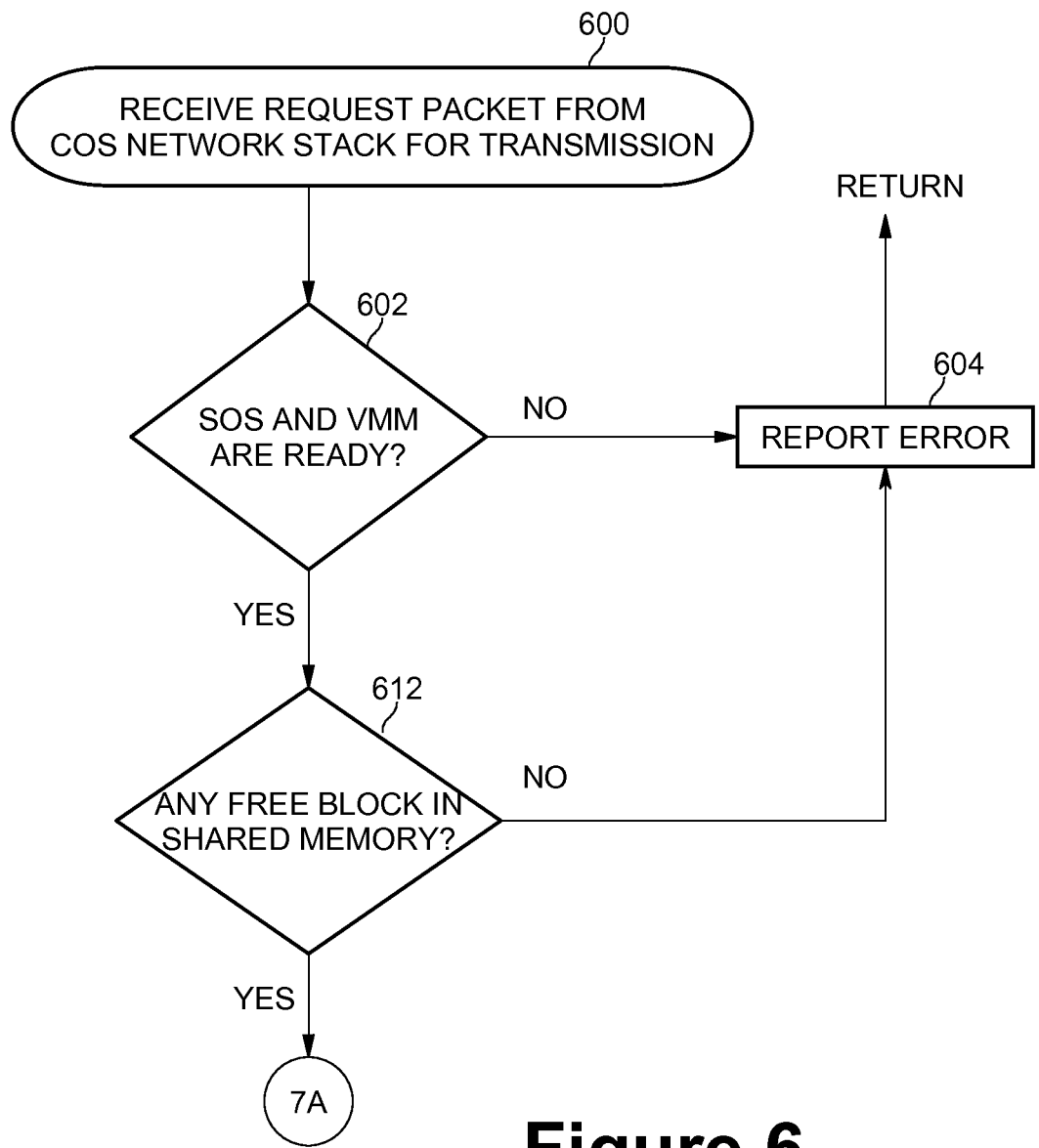
FIGS. 6-9 are flow diagrams of network request packet processing according to an embodiment of the present invention.
Figure 7:
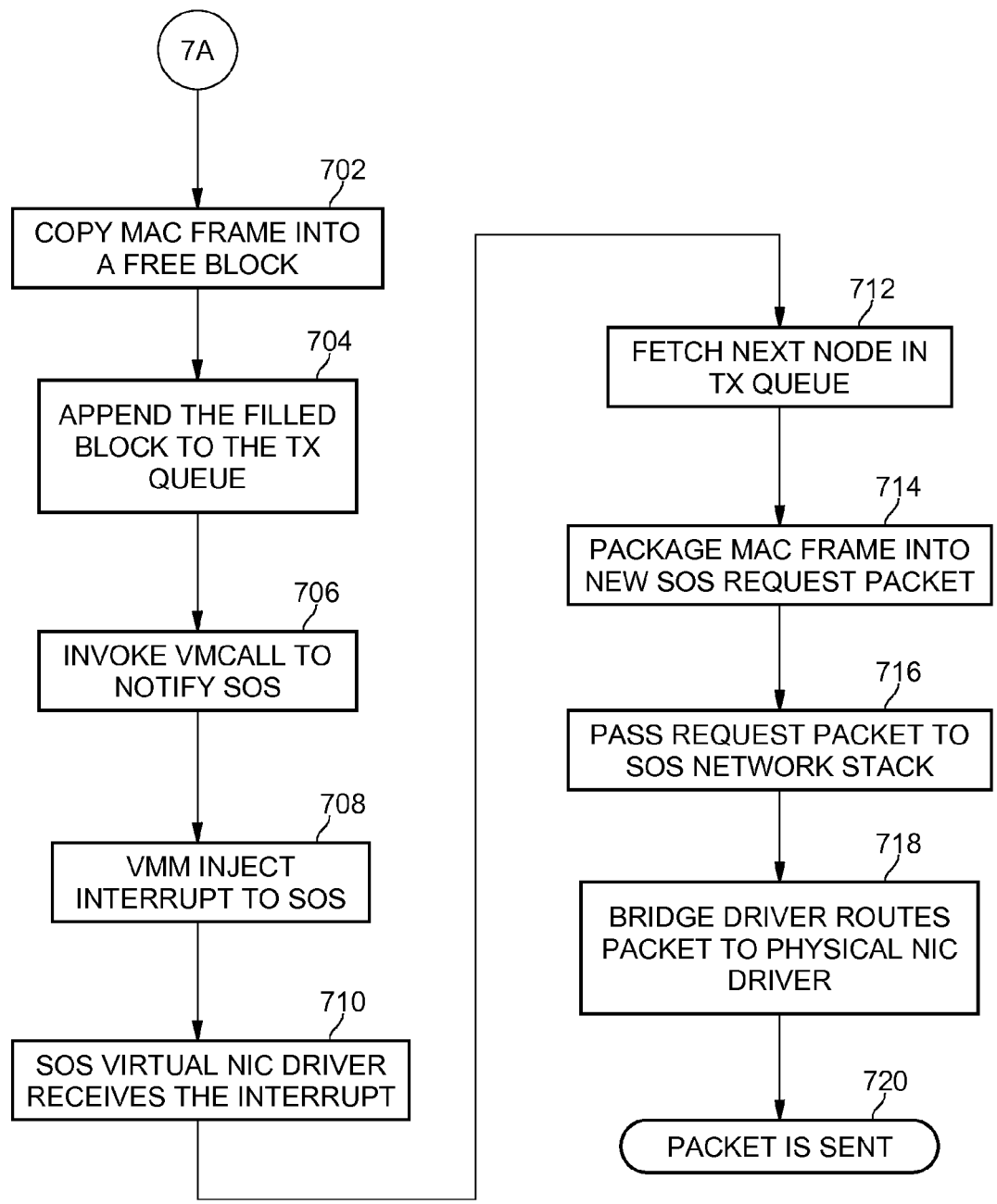

FIGS. 6 and 7 are flow diagrams of network request packet transmission processing according to an embodiment of the present invention. At block 600, when a network request packet is received from the Customer OS (COS) network stack 306 for transmission over the physical NIC device, a check may be made at 602 by the COS virtual NIC driver 308 to determine if the Service OS (SOS) 216 and the VMM 204 are ready. If either the Service OS or the VMM (or both) are not ready, then processing continues with block 604 where an error message may be reported and control may be returned back to the Customer OS. If the Service OS and the VMM are ready at block 602, then a check may be made at block 612, if any free blocks are available in shared memory. If no free blocks are available, processing continues with block 604 where an error may be reported. If free blocks are available, processing continues with block 702 on FIG. 7.

At block 702 of FIG. 7, COS virtual NIC driver 308 copies the MAC frame of the network request packet into a free block in shared memory 504. At block 704, the newly filled block may be appended to the transmission queue TX 506. The COS virtual NIC driver 308 then invokes the VMCALL instruction 510 at block 706 to notify the Service OS 216 via the VMM 204. At block 708, the VMM injects an interrupt 516 to the Service OS. In response, SOS virtual NIC driver 316 within the Service OS receives the interrupt at block 710 and fetches the next node in the transmission queue TX 506 at block 712. At block 714, the SOS virtual NIC driver 316 packages the MAC frame information from the next node in the transmission queue TX into a new Service OS request packet. SOS virtual NIC driver 316 then passes the new Service OS request packet to Service OS network stack 314 at block 716. Next, at block 718 bridge driver 502 routes the new Service OS request packet to physical NIC driver 318. The new Service OS request packet is sent over the network interface by the physical NIC driver at block 720.

Figure 8:
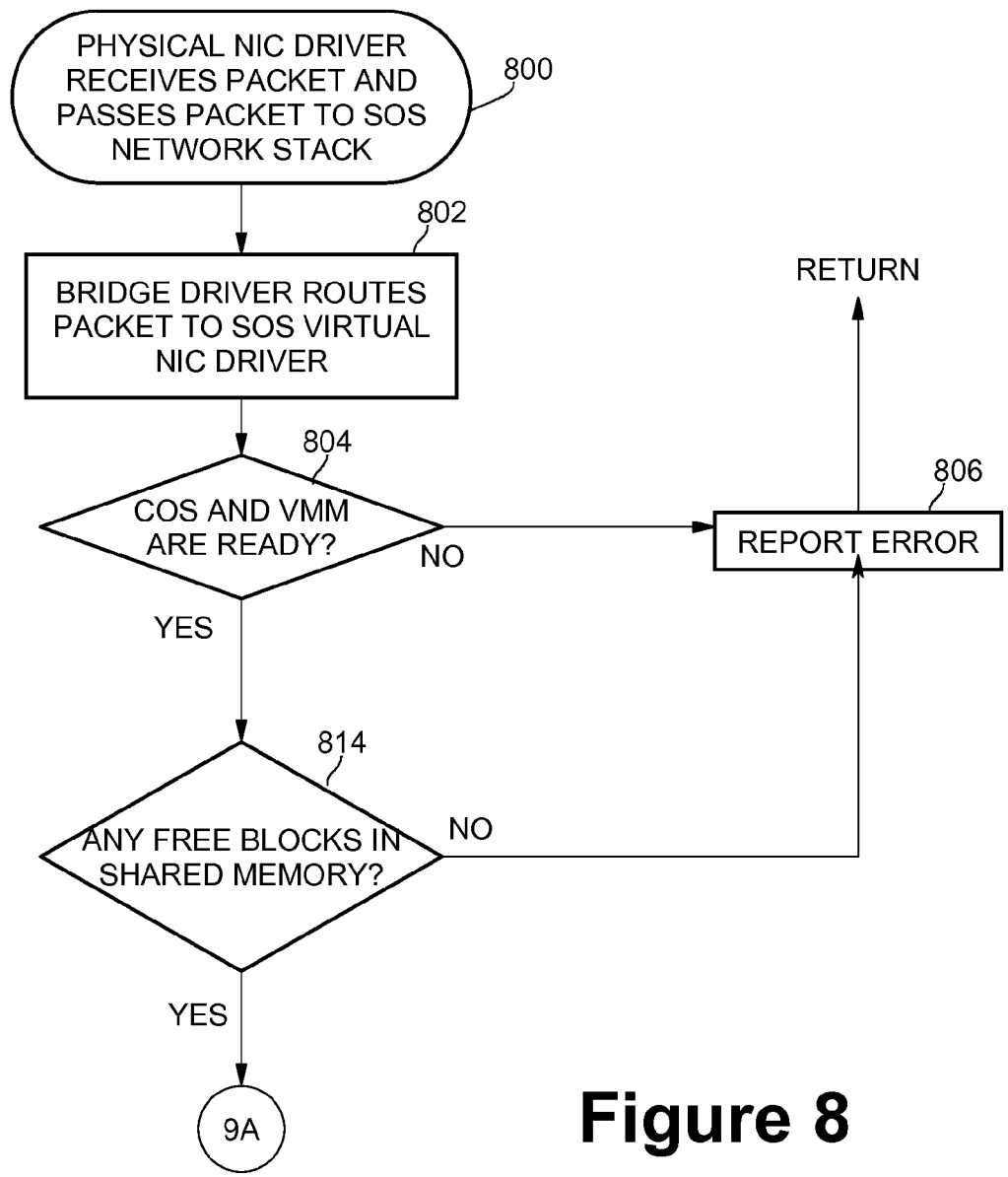
Figure 9:
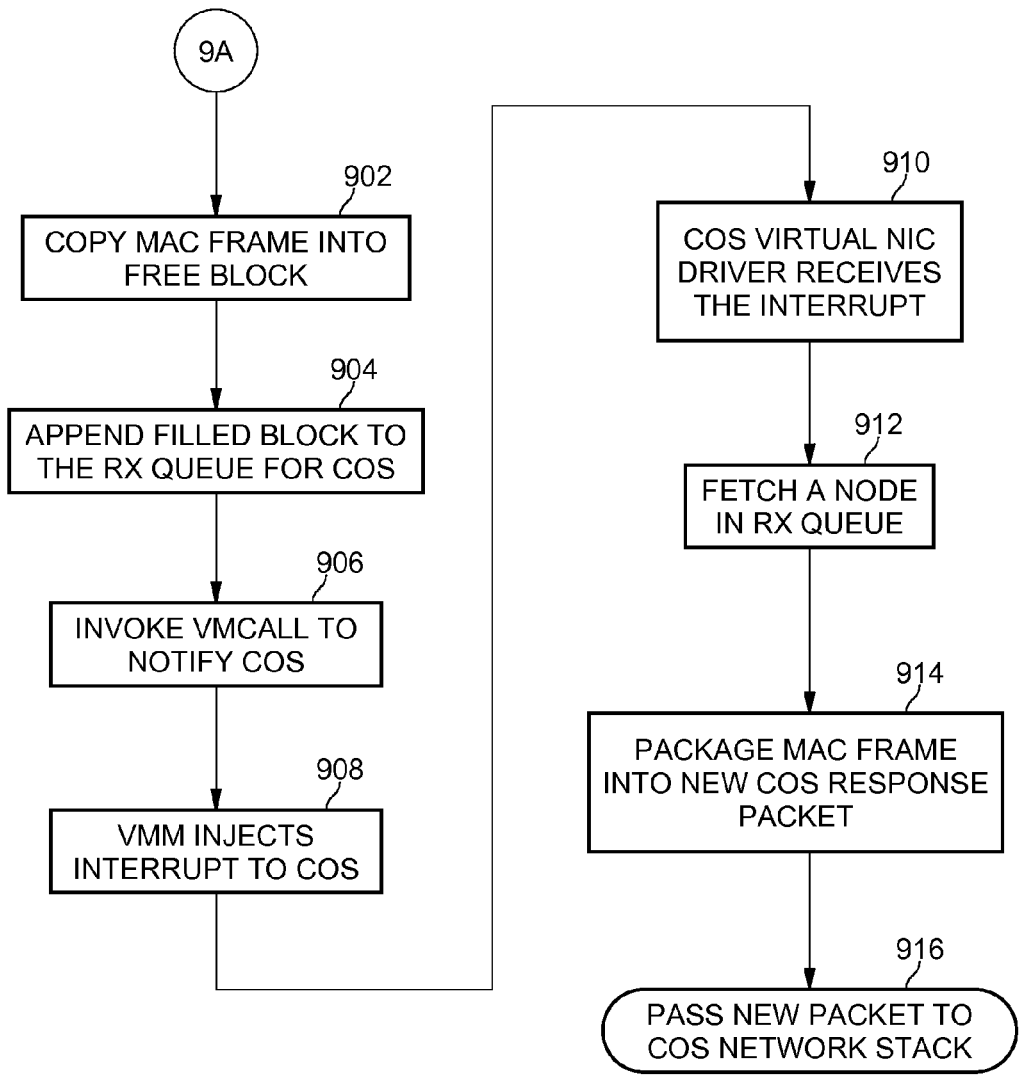

FIGS. 8 and 9 are flow diagrams of network request packet reception processing according to an embodiment of the present invention. At block 800, physical NIC driver 318 receives at least one network packet from the physical NIC device 322 and passes the network packet to the SOS network stack 314 within the Service OS 216. At block 802, bridge driver 502 within network stack routes the incoming packet to the SOS virtual NIC driver 316 in the Service OS. A check may then be made at block 804 by the SOS virtual NIC driver 316 to determine if the Customer OS (COS) 210 and the VMM 204 are ready. If either the Customer OS or the VMM (or both) are not ready, then processing continues with block 806 where an error message may be reported and control may be returned back to the Service OS. If the Customer OS and VMM are ready, then at block 814, a check may be made if any free blocks are available in shared memory. If no free blocks are available, processing continues with block 806 and an error message may be reported. If free blocks are available, processing continues with block 902 on FIG. 9.

At block 902 of FIG. 9, SOS virtual NIC driver 316 copies the MAC frame of the received network packet into a free block in shared memory 504. At block 904, the newly filled block may be appended to the reception queue RX 508. The SOS virtual NIC driver 316 then invokes the VMCALL instruction 514 at block 906 to notify the Customer OS 210 via the VMM 204. At block 908, the VMM injects an interrupt 512 to the Customer OS. In response, COS virtual NIC driver 308 within the Customer OS receives the interrupt at block 910 and fetches the next node in the reception queue RX 508 at block 912. At block 914, the COS virtual NIC driver 308 packages the MAC frame information from the next node in the reception queue RX into a new Customer OS response packet. COS virtual NIC driver 308 then passes the new response packet to Customer OS network stack 306 at block 916, and onward to application program 304.

Thus, embodiments of the present invention may share one physical NIC device among multiple virtual machines when a user's application programs running in Customer OSs need access to the network. There is no need to install additional physical NIC devices.

One skilled in the art will recognize the option of implementing different schemes to provide multiple virtual machines secure access to a single physical NIC device—without deviating from the scope of the present invention. One skilled in the art will also recognize that the disclosed invention may be applied to different types of virtualized environments and virtualization systems, pure software or hardware-assisted, that may employ either partial or complete virtualization of computer systems or programming environments.

One skilled in the art will also recognize that the number of Customer OSs and corresponding Customer VMs may be greater than two and implementation dependent. Further, when two or more Customer VMs are concurrently running, one customer VM may be running one kind of OS (such as Microsoft Windows 7, for example) and another customer VM may be running another kind of OS (such as Linux, for example).

Furthermore, one skilled in the art will recognize that embodiments of the present invention may be implemented in other ways and using various programming languages.

The techniques described herein are not limited to any particular hardware or software configuration; they may find applicability in any computing or processing environment. The techniques may be implemented in logic embodied in hardware, software, or firmware components, or a combination of the above. The techniques may be implemented in programs executing on programmable machines such as mobile or stationary computers, personal digital assistants, set top boxes, cellular telephones and pagers, and other electronic devices, that each include a processor, a storage medium readable by the processor (including volatile and non-volatile memory and/or storage elements), at least one input device, and one or more output devices. Program code is applied to the data entered using the input device to perform the functions described and to generate output information. The output information may be applied to one or more output devices. One of ordinary skill in the art may appreciate that the invention can be practiced with various computer system configurations, including multi-core processors, multiprocessor systems, minicomputers, mainframe computers, and the like. The invention can also be practiced in distributed computing environments where tasks may be performed by remote processing devices that are linked through a communications network.

Each program may be implemented in a high level procedural or object oriented programming language to communicate with a processing system. However, programs may be implemented in assembly or machine language, if desired. In any case, the language may be compiled or interpreted.

Program instructions may be used to cause a general-purpose or special-purpose processing system that is programmed with the instructions to perform the operations described herein. Alternatively, the operations may be performed by specific hardware components that contain hard-wired logic for performing the operations, or by any combination of programmed computer components and custom hardware components. The methods described herein may be provided as a computer program product that may include a machine readable medium having stored thereon instructions that may be used to program a processing system or other electronic device to perform the methods. The term "machine readable medium" used herein shall include any medium that is capable of storing or encoding a sequence of instructions for execution by the machine and that cause the machine to perform any one of the methods described herein. The term "machine readable medium" shall accordingly include, but not be limited to, solid-state memories, optical and magnetic disks. Furthermore, it is common in the art to speak of software, in one form or another (e.g., program, procedure, process, application, module, logic, and so on) as taking an action or causing a result. Such expressions are merely a shorthand way of stating the execution of the software by a processing system to cause the processor to perform an action or produce a result.

While this invention has been described with reference to illustrative embodiments, this description is not intended to be construed in a limiting sense. Various modifications of the illustrative embodiments, as well as other embodiments of the invention, which are apparent to persons skilled in the art to which the invention pertains are deemed to lie within the scope of the invention.

What is claimed is:

1. A method of sharing a physical NIC device among multiple virtual machines comprising:
   receiving, by a virtual network interface card (NIC) driver of a customer operating system (OS) running in a customer virtual machine on a computing system, a customer OS request packet for transmission by a physical NIC driver over a network coupled to the computing system, the customer OS request packet comprising OS related information and media access control frame information;
   extracting, by the virtual NIC driver of the customer OS, the media access control frame information from the customer OS request packet;
   discarding the OS related information from the customer OS request packet;
   copying the media access control frame information extracted from the customer OS request packet into a free block of shared memory of the computing system and appending the block to a transmission queue in the shared memory;
   fetching the block of shared memory from the transmission queue by a virtual NIC driver of a service OS running in a service virtual machine;
   repackaging, by the virtual NIC driver of the service OS, the extracted media access control frame information from the fetched block of shared memory to generate a new service OS request packet that is different from the customer OS request packet;
   passing the new service OS request packet to a service OS network stack component of the service OS;
   routing the new service OS request packet, by a bridge driver of the service OS network stack component, to the physical NIC driver; and
   sending, by the physical NIC driver, the new service OS request packet over the network via the physical NIC device.

2. The method of claim 1, further comprising invoking a VMCALL instruction by the customer OS virtual NIC driver to cause a virtual machine manager (VMM) of the computing system to notify the service OS virtual NIC driver that a Customer OS request packet is available, and the VMM to inject an interrupt to the service OS virtual NIC driver.

3. The method of claim 1, wherein the service OS executes within a secure enclave session provided by a processor of the computing system.

4. The method of claim 1, wherein the customer virtual machine comprises a first customer virtual machine, the customer OS comprises a first customer OS, the virtual NIC driver of the customer OS comprises a first virtual NIC driver of the first customer OS, and the customer OS request packet comprises a first customer OS request packet; and further comprising:
 receiving, by a second virtual network interface card (NIC) driver of a second customer operating system (OS) running in a second customer virtual machine on the computing system, the second customer virtual machine running on the computing system concurrently with the first customer virtual machine, a second customer OS request packet for transmission by the physical NIC driver, the second customer OS request packet comprising OS related information and media access control frame information from the second customer OS;
 extracting the media access control frame information from the second customer OS request packet;
 discarding the OS related information from the second customer OS request packet; and
 copying the media access control frame information extracted from the second customer OS request packet into a free block of shared memory of the computing system and appending the block to the transmission queue in the shared memory.

5. The method of claim 4, wherein the first customer OS and the second customer OS are different OSs.

6. The method of claim 2, wherein the VMM allocates an area of shared memory for the transmission queue that is accessible by the customer OS and the service OS.

7. A non-transitory machine-readable medium comprising a plurality of machine instructions stored thereon that in response to being executed by a processor of a computing device, cause the computing device to:
 receive, by a virtual network interface card (NIC) driver of a customer operating system (OS) running in a customer virtual machine on the computing device, a customer OS request packet for transmission by a physical NIC driver over a network coupled to the computing device, the customer OS request packet comprising OS related information and media access control frame information;
 extract, by the virtual NIC driver of the customer OS, the media access control frame information from the customer OS request packet;
 discard the OS related information from the customer OS request packet;
 copy the media access control frame information extracted from the customer OS request packet into a free block of shared memory of the computing device and append the block to a transmission queue in the shared memory;
 fetch the block of shared memory from the transmission queue by a virtual NIC driver of a service OS running in a service virtual machine;
 repackage, by the virtual NIC driver of the service OS, the extracted media access control frame information from the fetched block of shared memory to generate a new service OS request packet that is different from the customer OS request packet;
 pass the new service OS request packet to a service OS network stack component of the service OS;
 route the new service OS request packet, by a bridge driver of the service OS network stack component, to the physical NIC driver; and
 send, by the physical NIC driver, the new service OS request packet over the network via the physical NIC device.

8. The non-transitory machine-readable medium of claim 7, wherein the plurality of instructions further cause the computing device to invoke a VMCALL instruction by the customer OS virtual NIC driver to cause a virtual machine manager (VMM) of the computing device to notify the service OS virtual NIC driver that a Customer OS request packet is available, and the VMM to inject an interrupt to the service OS virtual NIC driver.

9. The non-transitory machine-readable medium of claim 7, wherein the instructions for the service OS execute within a secure enclave session provided by a processor of the computing device.

10. The non-transitory machine-readable medium of claim 7, wherein the customer virtual machine comprises a first customer virtual machine, the customer OS comprises a first customer OS, the virtual NIC driver of the customer OS comprises a first virtual NIC driver of the first customer OS, and the customer OS request packet comprises a first customer OS request packet; and
 wherein the plurality of instructions further cause the computing device to:
  receive, by a second virtual network interface card (NIC) driver of a second customer operating system (OS) running in a second customer virtual machine on the computing device, the second customer virtual machine running on the computing device concurrently with the first customer virtual machine, a second customer OS request packet for transmission by the physical NIC driver, the second customer OS request packet comprising OS related information and media access control frame information from the second customer OS;
  extract the media access control frame information from the second customer OS request packet;
  discard the OS related information from the second customer OS request packet; and
  copy the media access control frame information extracted from the second customer OS request packet into a free block of shared memory of the computing device and append the block to the transmission queue in the shared memory.

11. A computing system for sharing a physical NIC device among multiple virtual machines comprising:
 a non-transitory machine readable medium having a plurality of machine instructions stored thereon that in response to being executed by the computing system, cause the computing system to:
  execute a virtual machine manager, the virtual machine manager to launch a customer virtual machine and a service virtual machine;
  the customer virtual machine running a customer operating system (OS), the customer OS including a customer OS virtual network interface card (NIC) driver to: (i) receive a customer OS request packet for transmission by the physical NIC device over a network coupled to the computing system, the customer OS request packet comprising OS related information and media access control frame information, (ii) extract the media access control frame information from the customer OS request packet, (iii) discard the OS related information from the customer OS request packet, (iv) copy the media access control frame information extracted from the customer OS request packet into a free block of shared memory of the computing system, and (v) append the block to a transmission queue in the shared memory; and
  the service virtual machine running a service OS, the service OS including:
   (i) a service OS virtual NIC driver to: (a) fetch the block of shared memory from the transmission queue, and (b) repackage the extracted media access control frame information from the fetched block of shared memory to generate a new service OS request packet that is different from the customer OS request packet, (ii) a service OS network stack component to receive the new service OS request packet from the service OS virtual NIC driver; and (iii) a physical NIC driver to receive the new service OS request packet from the service OS network stack component and to transmit the new service OS request packet to the physical NIC device.

12. The computing system of claim 11, wherein the customer OS virtual NIC driver invokes a VMCALL instruction to the VMM to notify the service OS virtual NIC driver that a customer OS request packet is available, and the VMM injects an interrupt to the service OS virtual NIC driver.

13. The computing system of claim 11, wherein the service OS executes within a secure enclave session provided by a processor of the computing system.

14. The computing system of claim 11, wherein the customer virtual machine comprises a first customer virtual machine, the customer OS comprises a first customer OS, the virtual NIC driver of the customer OS comprises a first virtual NIC driver of the first customer OS, and the customer OS request packet comprises a first customer OS request packet; and wherein the virtual machine manager further to launch a second customer virtual machine to run concurrently with the first customer virtual machine, the second customer virtual machine to run a second customer OS comprising a second virtual NIC driver, the second virtual NIC driver to: (i) receive a second customer OS request packet for transmission by the physical NIC driver, the second customer OS request packet comprising OS related information and media access control frame information from the second customer OS, (ii) extract the media access control frame information from the second customer OS request packet, (iii) discard the OS related information from the second customer OS request packet, and (iv) copy the media access control frame information extracted from the second customer OS request packet into a free block of shared memory of the computing system and append the block to the transmission queue in the shared memory.

15. The computing system of claim 14, wherein the first customer OS and the second customer OS are different OSs.

16. The computing system of claim 12, wherein the VMM allocates an area of shared memory for the transmission queue that is accessible by the customer OS and the service OS.

17. A method of sharing a physical NIC device among multiple virtual machines comprising:

receiving, by a physical network interface card (NIC) driver of a service operating system (OS) running in a service virtual machine on a computing system, a network packet received by the physical NIC device over a network coupled to the computing system, the network packet comprising OS related information and media access control frame information;

routing the network packet, by a bridge driver component of a service OS network stack component, to a service OS virtual NIC driver;

extracting, by the service OS virtual NIC driver, the media access control frame information from the network packet;

discarding the OS related information from the network packet;

copying, by the service OS virtual NIC driver, the media access control frame information extracted from the network packet into a free block of shared memory of the computing system and appending the block to a reception queue in the shared memory;

fetching the block of shared memory from the reception queue by a virtual NIC driver of a customer OS running in a customer virtual machine;

repackaging, by the customer OS virtual NIC driver, the extracted media access control frame information from the fetched block of shared memory to generate a new customer OS request packet that is different from the network packet; and passing, by the customer OS virtual NIC driver, the new customer OS request packet to a customer OS network stack component.

18. The method of claim 17, further comprising invoking a VMCALL instruction by the service OS virtual NIC driver to cause a virtual machine manager (VMM) of the computing system to notify the customer OS virtual NIC driver that a network packet is available, the VMM to inject an interrupt to the customer OS virtual NIC driver.

19. The method of claim 17, wherein the service OS executes within a secure enclave session provided by a processor of the computing system.

20. The method of claim 17, wherein the customer virtual machine comprises a first customer virtual machine, the customer OS comprises a first customer OS, the virtual NIC driver of the customer OS comprises a first virtual NIC driver of the first customer OS, the new customer OS request comprises a first new customer OS request packet, and the customer OS network stack component comprises a first customer OS network stack component; and further comprising:

fetching the block of shared memory from the reception queue by a second virtual NIC driver of a second customer OS running in a second customer virtual machine, the second customer virtual machine running on the computing system concurrently with the first customer virtual machine;

repackaging the extracted media access control frame information into a second new customer OS request packet; and passing, by the second customer OS virtual NIC driver, the second new customer OS request packet to a second customer OS network stack component.

21. The method of claim 20, wherein the first customer OS and the second customer OS are different OSs.

22. The method of claim 18, wherein the VMM allocates an area of shared memory for the reception queue that is accessible by the customer OS and the service OS.

23. A non-transitory machine-readable medium comprising a plurality of machine instructions stored thereon that in response to being executed by a processor of a computing device, cause the computing device to:

receive, by a physical network interface card (NIC) driver of a service operating system (OS) running in a service virtual machine on the computing device, a network packet received by the physical NIC device over a network coupled to the computing device, the network packet comprising OS related information and media access control frame information;

route the network packet, by a bridge driver component of a service OS network stack component, to a service OS virtual NIC driver;

extract, by the service OS virtual NIC driver, the media access control frame information from the network packet;
discard the OS related information from the network packet;
copy, by the service OS virtual NIC driver, the media access control frame information extracted from the network packet into a free block of shared memory of the computing device and append the block to a reception queue in the shared memory;
fetch the block of shared memory from the reception queue by a virtual NIC driver of a customer OS running in a customer virtual machine;
repackage, by the customer OS virtual NIC driver, the extracted media access control frame information from the fetched block of shared memory to generate a new customer OS request packet that is different from the network packet; and
pass, by the customer OS virtual NIC driver, the new customer OS request packet to a customer OS network stack component.

24. The non-transitory machine-readable medium of claim 23, wherein the plurality of instructions further cause the computing device to invoke a VMCALL instruction by the service OS virtual NIC driver to cause a virtual machine manager (VMM) of the computing device to notify the customer OS virtual NIC driver that a network packet is available, and the VMM to inject an interrupt to the customer OS virtual NIC driver.

25. The non-transitory machine-readable medium of claim 23, wherein the service OS executes within a secure enclave session provided by a processor of the computing device.

26. The non-transitory machine-readable medium of claim 23, wherein the customer virtual machine comprises a first customer virtual machine, the customer OS comprises a first customer OS, the virtual NIC driver of the customer OS comprises a first virtual NIC driver of the first customer OS, the new customer OS request packet comprises a first new customer OS request packet, and the customer OS network stack component comprises a first customer OS network stack component; and
wherein the plurality of instructions further cause the computing device to: (i) fetch the block of shared memory from the reception queue by a second virtual NIC driver of a second customer OS running in a second customer virtual machine, (ii) repackage the extracted media access control frame information into a second new customer OS request packet, (iii) pass, by the second customer OS virtual NIC driver, the second new customer OS request packet to a second customer OS network stack component, the second customer virtual machine running on the computing device concurrently with the first customer virtual machine.

27. A computing system for sharing a physical network interface card (NIC) device among multiple virtual machines comprising:
a non-transitory machine readable medium having a plurality of machine instructions stored thereon that in response to being executed by the computing system, cause the computing system to:
execute a virtual machine manager, the virtual machine manager to launch a customer virtual machine and a service virtual machine;
the service virtual machine running a service operating system (OS), the service OS including:
(i) a physical network interface card (NIC) driver to receive a network packet, the network packet being received by the physical NIC device over a network coupled to the computing system, and wherein the network packet comprising OS related information and media access control frame information;
(ii) a bridge driver component of a service OS network stack component to route the network packet; and
(iii) a service OS virtual NIC driver to: (a) receive the network packet from the bridge driver component, (b) extract the media access control frame information from the network packet, (c) discard the OS related information from the network packet, (d) copy the media access control frame information extracted from the network packet into a free block of a shared memory of the computing system, and (e) append the block to a reception queue in the shared memory; and
the customer virtual machine running a customer OS, the customer OS including:
(i) a customer OS virtual NIC driver to: (a) fetch the block of shared memory from the reception queue, and (b) repackage the extracted media access control frame information from the fetched block of shared memory to generate a new customer OS request packet that is different from the network packet; and
(ii) a customer OS network stack component to receive the new customer OS request packet from the customer OS virtual NIC driver.

28. The computing system of claim 27, wherein the service OS virtual NIC driver invokes a VMCALL instruction to the VMM to notify the customer OS virtual NIC driver that a request packet is available, and the VMM injects an interrupt to the customer OS virtual NIC driver.

29. The computing system of claim 27, wherein the service OS executes within a secure enclave session provided by a processor of the computing system.

30. The computing system of claim 27, wherein the customer virtual machine comprises a first customer virtual machine, the customer OS comprises a first customer OS, the virtual NIC driver of the customer OS comprises a first virtual NIC driver of the first customer OS, the new customer OS request packet comprises a first new customer OS request packet, and the customer OS network stack component comprises a first customer OS network stack component; and
wherein the virtual machine manager further to launch a second customer virtual machine to run concurrently with the first customer virtual machine, the second customer virtual machine to run a second customer OS comprising a second virtual NIC driver and a second customer OS network stack component, the second virtual NIC driver to: (i) fetch the block of the shared memory from the reception queue, and (ii) repackage the extracted media access control frame information into a second new customer OS request packet, and the second customer OS network stack component to receive the second new customer OS request packet.

31. The computing system of claim 30, wherein the first customer OS and the second customer OS are different OSs.

* * * * *